United States Patent [19]
Gandini et al.

[11] Patent Number: 5,645,066
[45] Date of Patent: Jul. 8, 1997

[54] MEDICAL ULTRASONIC DIAGNOSTIC IMAGING SYSTEM WITH SCANNING GUIDE FOR THREE DIMENSIONAL IMAGING

[75] Inventors: Rebecca L. Gandini, Issaquah; Delfin M. Catunao, Seattle; Jens Ulrich Quistgaard, Seattle; Lisa M. Butler, Seattle, all of Wash.

[73] Assignee: Advanced Technology Laboratories, Inc., Bothell, Wash.

[21] Appl. No.: 639,163

[22] Filed: Apr. 26, 1996

[51] Int. Cl.$^6$ .................................................... A61B 8/00
[52] U.S. Cl. ............................... 128/660.07; 128/916
[58] Field of Search ........................ 128/660.04, 660.05, 128/660.07, 661.1, 661.08, 661.09, 916

[56] References Cited

U.S. PATENT DOCUMENTS

| | | | |
|---|---|---|---|
| 4,341,120 | 7/1982 | Anderson | 73/618 |
| 5,078,145 | 1/1992 | Furuhata | 128/660.07 |
| 5,322,067 | 6/1994 | Prater et al. | 128/660.07 |
| 5,329,929 | 7/1994 | Sato et al. | 128/660.05 |
| 5,465,721 | 11/1995 | Kishimoto et al. | 128/660.07 |
| 5,474,073 | 12/1995 | Schwartz et al. | 128/661.1 |
| 5,485,842 | 1/1996 | Quistgaard | 128/66.07 |

OTHER PUBLICATIONS

VoxelView 2.5 User Guide, Vital Images, Inc. (1995) at introduction, Chapter 6 & Chapter 13.

*Primary Examiner*—George Manuel
*Attorney, Agent, or Firm*—W. Brinton Yorks, Jr.

[57] ABSTRACT

An ultrasonic diagnostic imaging system is provided with a scanning guide which assists a user in conducting three dimensional ultrasonic scanning of a patient. The guide is visual or audible or both, and gives the physician a real time indicator by which to gauge the rate and duration of three dimensional ultrasonic scanning. In a constructed embodiment the scanning guide is modulated by a counter coupled to cine memory, in which image frames are stored for three dimensional processing. As the cine memory fills toward capacity with ultrasonic image frames, the scanning guide is modulated in correspondence with the filling of the memory. A visual indicator of the ultrasonic frame sequence in memory is also provided, on which the user can move markers to eliminate frames at the beginning or end of the sequence from the three dimensional reconstruction.

27 Claims, 7 Drawing Sheets

MEDICAL ULTRASONIC DIAGNOSTIC IMAGING SYSTEM WITH SCANNING GUIDE FOR THREE DIMENSIONAL IMAGING

This invention relates to medical ultrasonic diagnostic imaging systems and, in particular, to a scanning aid which facilitates ultrasonic scanning of a three dimensional region of the body.

U.S. Pat. 5,474,073 describes three dimensional imaging techniques used in the HDI® 3000 ultrasonic diagnostic imaging system, the first commercial ultrasound system with fully integrated three dimensional imaging capability. One attribute of the techniques described in the '073 patent is the ability to gather three dimensional image data freehand, that is, with just an ordinary ultrasonic scanhead. The prior art is replete with complicated, awkward, and expensive mechanisms which attach to or hold a scanhead for three dimensional scanning. While such mechanisms are often capable of providing accurate interplane spacing measurements, their bulk, complexity, inconvenience and cost usually discourage all but the most persevering researchers. What physicians desire is to be able to perform three dimensional ultrasonic scanning without the need for excessive paraphernalia. The HDI 3000 system provides exactly that.

As the '073 patent explains, freehand scanning is often sufficient to gather image frames for accurate three dimensional image reconstruction. However, the scanning of a volume of the body, as opposed to a plane, is still a new experience for many physicians. It is not immediately apparent to the uninitiated how one must move the scanhead (probe) across the surface of the body in order to gather the desired image data. Once the physician does become accustomed to the freehand scanning technique, she becomes aware that anatomically more precise three dimensional presentations are created through careful, uniform scanning. Accordingly it is desirable to quickly instill scanning confidence in physicians who are experiencing three dimensional scanning for the first time, and to facilitate rapid improvement in the quality of the acquired three dimensional presentations.

Once a physician has reconstructed a three dimensional (3D) image it is often the desire of the physician to be able to tailor the image to present only the anatomy which the physician seeks to examine. Organs and tissue which surround a region of interest should be removed, both to provide a clear view of the physiology in question and to enable rapid three dimensional reconstruction processing. Moreover, the physician should be assured that the 3D image reconstruction is proceeding smoothly to its conclusion. Furthermore, after the physician sees the three dimensional presentation, she should have the ability to further modify the image for an even more improved three dimensional image presentation.

In accordance with the principles of the present invention, a visual and/or audible scanning guide is provided to aid the physician in ultrasonic scanning of the body for three dimensional imaging. The guide calibrates the physician's scanning to a desired sweep speed across the body. The guide also provides information as to the amount of image data which has been acquired. The guide is further capable of informing the physician as to the point that a sufficient quantum of image data has been gathered for three dimensional reconstruction. In a preferred embodiment both a scanning speed reference and a measure of acquired three dimensional image data are provided simultaneously by the same guide. In a constructed embodiment the scanning guide is a visual and/or audible indicator which is visually or audibly modulated in correspondence with desired scanning speed, and has a magnitude or duration which represents a measure of acquired three dimensional image data.

In accordance with a further aspect of the present invention, the scanning guide may be used as a scanning training aid. The guide is repetitively cycled through its range of modulation, enabling the physician to immediately gauge scanning speed and duration. In accordance with yet another aspect of the present invention, the scanning guide also provides an indicator of the point at which a sufficient amount of image data has been acquired for three dimensional reconstruction. In a constructed embodiment the indicator signals the filling of the three dimensional image data buffer of the ultrasound system.

In accordance with still a further aspect of the present invention, the physician is given a visual representation of the acquired image data set, and is able to designate a portion or portions of the image data set which are to be excluded from the next three dimensional ultrasonic image reconstruction. This enables the physician to strip away planes of tissue structure and blood flow which are extraneous to the physiology which the physician is seeking to examine, and to concentrate the three dimensional image reconstruction on the region of interest in the body. For instance, suppose the physician is interested in examining a three dimensional image of the kidney, and scans the kidney from one side where it is bounded by the liver to another side where it is bounded by the intestines. Suppose that the physician sees in the three dimensional image that the kidney is obscured by a region of the liver which was inadvertently scanned before the probe began acquiring image planes from the kidney. The present invention allows the physician to trim away the unwanted liver image planes in the image plane sequence to form an image sequence for construction into a three dimensional image with a view which is unimpeded by the liver. If the physician is dissatisfied with the modified three dimensional presentation, the starting data set is retained in the ultrasound system so that the physician can modify the image data set in other respects to obtain a three dimensional ultrasonic image which is most useful to the physician's diagnosis. The physician is also provided with a real time indicator of the progress being made during three dimensional ultrasonic image reconstruction.

Figure 1:
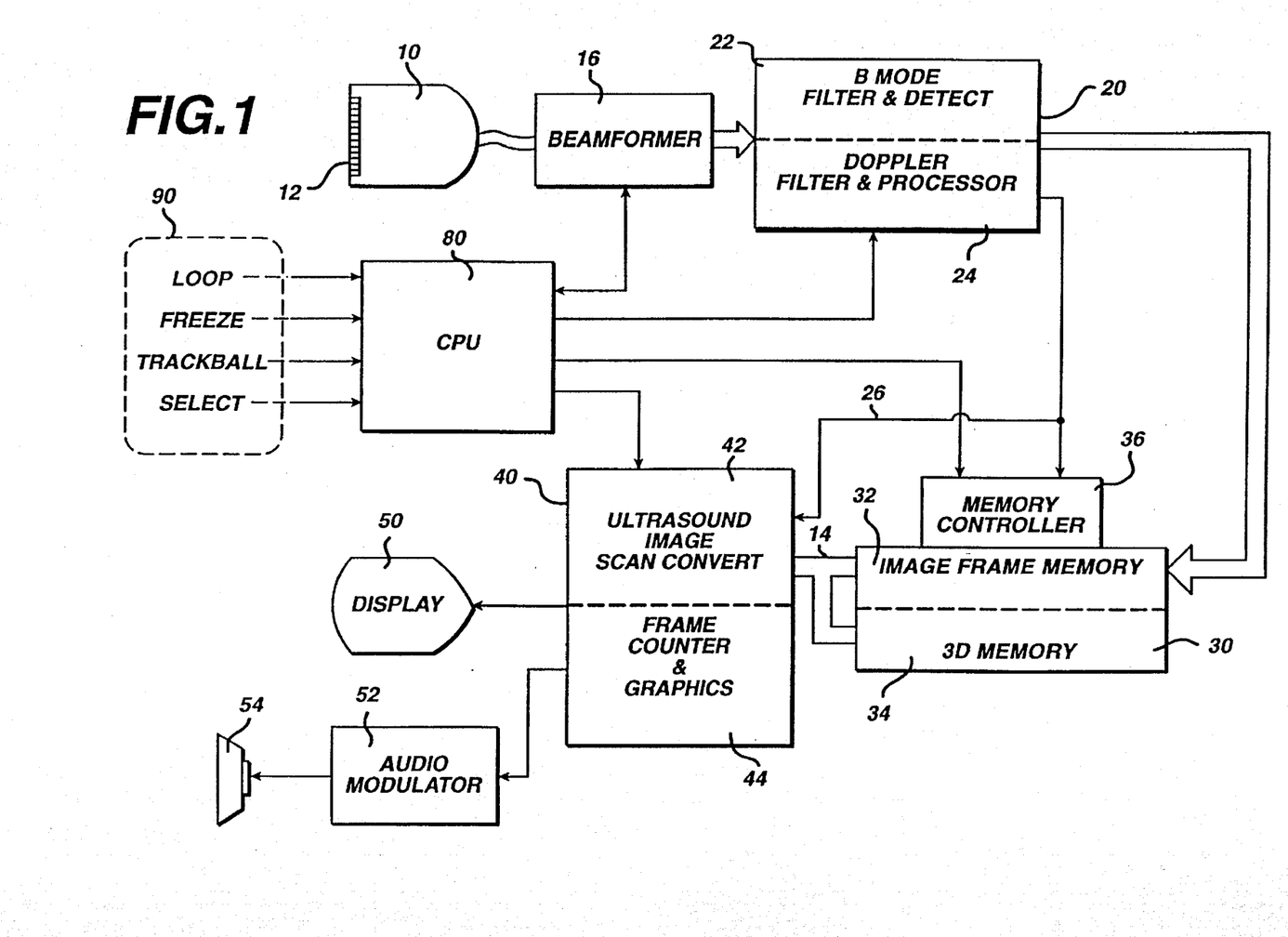
FIG. 1 illustrates in block diagram form a medical ultrasonic diagnostic imaging system constructed in accordance with the principles of the present invention.

Referring first to FIG. 1, a block diagram of a medical ultrasonic diagnostic imaging system constructed in accordance with the principles of the present invention is shown. An ultrasonic probe 10 includes a transducer array 12 which transmits and receives beams of ultrasonic energy along predetermined scanline directions under control of a beamformer 16. Ultrasonic echoes received by the elements of the transducer array are formed into coherent echoes along each scanline by the beamformer.

The scanline echoes are processed by a digital signal processor (DSP) 22. The DSP 22 is capable of processing the received scanlines in a number of different ways, as indicated by the partition drawn on the DSP block 20. The DSP 22 includes B mode processing 22, which filters and detects echo information for the formation of B mode images. The DSP 22 also includes Doppler processing 24, which filters and processes ensembles of scanlines to produce Doppler signal information, such as flow velocity, variance, or Doppler power. As the '073 patent points out, Doppler power images have been found to produce excellent three dimensional ultrasonic image renderings.

The B mode or Doppler scanlines are coupled to an image memory 30 which is partitioned into two sections, an image frame memory 32 and a 3D memory 34, both of which are controlled by a memory controller 36. The memory controller 36 receives control signals from the DSP 22 over a control line 26 which provides the controller with information such as the start or end of a sequence of scanlines which comprise an image frame. The scanlines received from the DSP are either temporarily stored in the image frame memory 32 or immediately coupled over a data bus 14 to a scan converter 40. The scan converter 40 has two sections called a pixel space processor (PSP) 42 and a pixel conversion module (PCM) 44. The PSP 42 processes ultrasonic image data into ultrasound images of the desired format and line density through interpolation and coordinate transformation of the scanline data. The PCM includes a frame counter and a graphics processor which produces a graphic overlay for the ultrasound image that provides graphical information such as depth markers, cursors, text, and other graphical information. The combined image including the ultrasonic images and the graphical information may then be displayed on an image display 50.

When the ultrasound system of FIG. 1 is operated in the two dimensional (2D) B mode, grayscale scanlines pass through the image frame memory 32 and are immediately scan converted by the PSP and displayed in real time. By pressing a "Freeze" button on the ultrasound system control panel 90, the image being displayed at that moment on the display 50 is continually displayed until the button is pressed again to return to real time display. The user can also press a "Loop" button on the control panel to store a sequence of image frames in the image frame memory 32. Frames are sequentially stored in the image frame memory until the user presses the Freeze button, at which time the current contents of the image frame memory are retained. The user can then step through the memory and display each frame in succession, or can replay the retained frames in a slow motion or real time Cineloop® display.

Similar processing and display techniques are employed when the ultrasound system is operated in the 2D Doppler mode. A Doppler image of motion or flow is entered into the image frame memory, is scan converted and displayed in real time. Generally, Doppler images of flow conditions in the body are combined or overlaid with B mode images to provide the structure of the tissue or organs in which the flow is occurring. An effective technique for three dimensional imaging is to use power Doppler images without B mode information, since B mode information often has the effect of cluttering the resultant 3D display.

The ultrasound system of FIG. 1 produces three dimensional ultrasonic images in accordance with the principles of the present invention. In a constructed embodiment, a physician preparing to form three dimensional ultrasonic images will perform a survey scan of the patient to locate the region of interest (ROI) which she desired to image in three dimensionally. This is the initial step 71 in the flowchart of FIG. 2. As the physician locates the ROI, she notes the boundaries of the ROI in the 2D images on the ultrasound display and plots a path for the probe to travel across the patient's body which will sweep the image plane of the probe through the ROI from one side of the ROI to another.

Figure 2:
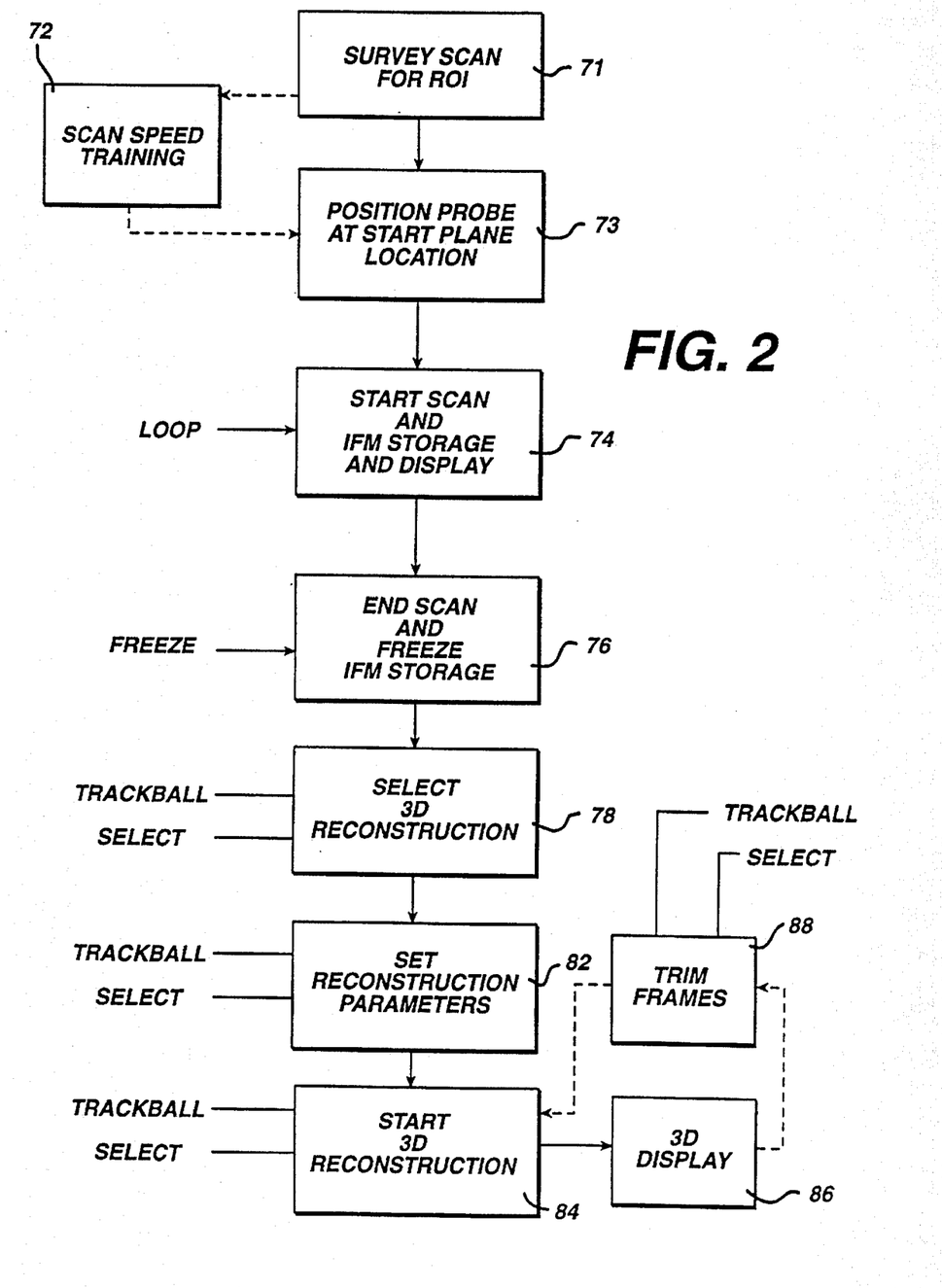
FIG. 2 is a flowchart explaining the procedure for acquiring and processing three dimensional ultrasonic image information in accordance with the principles of the present invention.

The next step is to scan through the ROI by sliding the probe 10 across the patient's body, acquiring a sequence of substantially parallel ultrasonic image planes from one side of the ROI to another. If the physician is unfamiliar with 3D ultrasonic scanning or wishes to practice scanning or wishes to gauge the scanning speed which will acquire the greatest number of image planes, or "slices", of the ROI, she can activate the scanning guide of the present invention prior to acquiring a sequence of image slices for 3D reconstruction.

A constructed embodiment of the present invention has a number of control buttons on the control panel 90 of the ultrasound system. The control buttons are connected to the central processing unit (CPU) of the ultrasound system, which issues control signals to the components of the system which will carry out the commands issued by way of the control buttons. The "Loop" button, for instance, results in the issuance of a command to the memory controller 36 which clears the image frame memory 32 and begins to store image frames at consecutively addressed locations in the memory. The memory is cleared by resetting the address pointer of the memory 32 to the beginning of the memory. After the Loop button has been depressed the image frame memory will store sequentially received image frames until it is completely full, and will then wrap around to the starting address and continue filling the memory with received image frames. The memory 32 will continue this sequence of operation until the physician presses the "Freeze" button, which causes the CPU to issue a command to the memory controller 36 that halts the memory 32, retaining its current contents.

An image frame memory which operates in this fashion is ideally suited for use as a Cineloop memory. A Cineloop memory stores a real time 2D image sequence upon command by the user, which can be recalled and examined in close detail later. The Cineloop sequence can be replayed in its real time speed, in slow motion or by sequentially stepping through the frame sequence to observe subtleties of tissue motion, such as heart valve performance, which are difficult to detect in real time.

Figure 3:
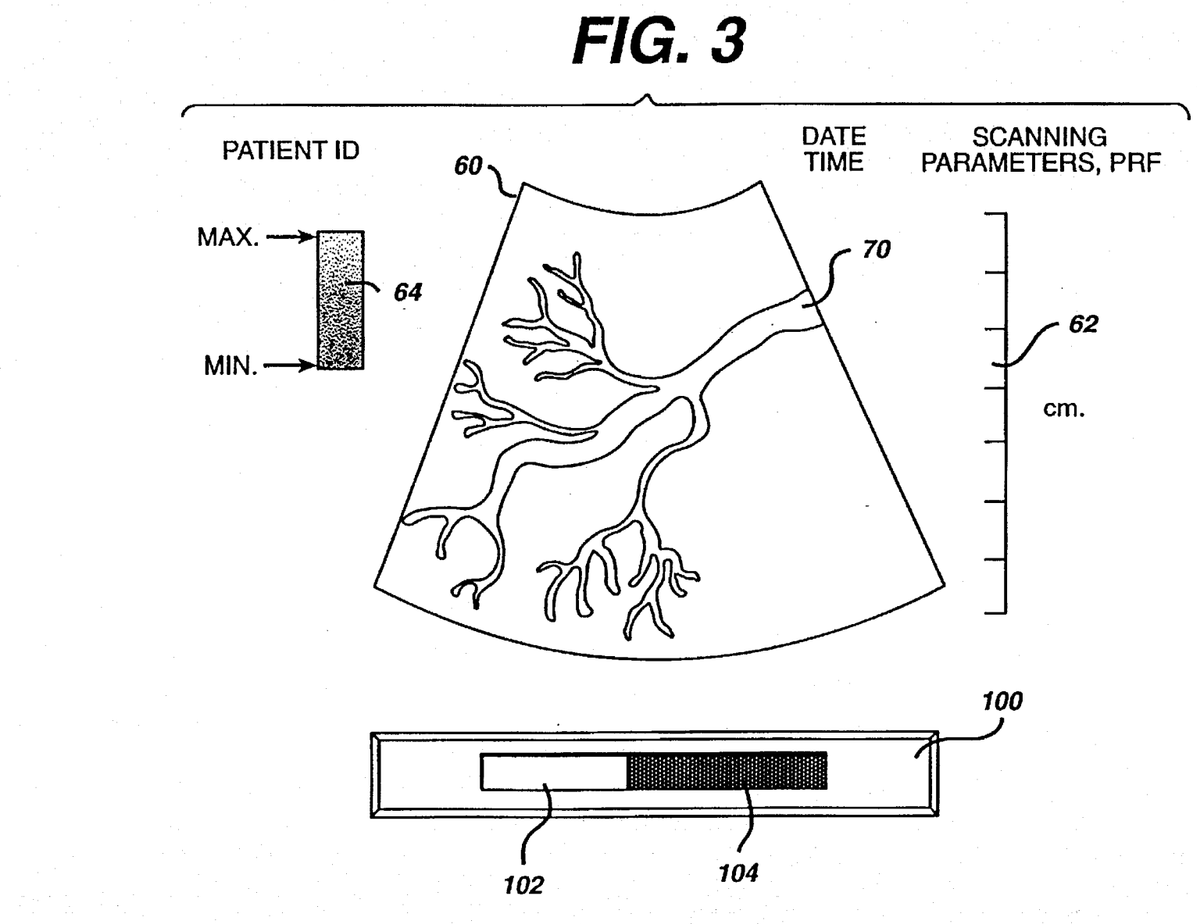
FIG. 3 illustrates an ultrasound image display which shows a visual scanning guide of the present invention.

In accordance with the principles of the present invention, the image frame memory 32 stores a sequence of 2D image slices which are to be reconstructed to form a three dimensional ultrasonic image. To assist the physician in acquiring image slices and storing them in the memory 32, a visual guide depicting the filling of the memory 32 is shown on the display. FIG. 3 illustrates an ultrasound display which embodies the principles of the present invention. In FIG. 3, a box 100 is shown at the bottom of the display screen below an ultrasound image 60. In this example the ultrasound image 60 is one of a sequence of power Doppler images of blood flow network 70. A color or grayscale bar 64 is to the left of the image and depth graphics are shown to the right of the image. The box 100 includes a window 104 which represents the capacity of the image frame memory 32. When the memory 32 is cleared the window is completely black as shown in the right side of the window. As the final scanline of an image frame is sent to the memory 32 from the DSP 22, the DSP issues a signal on line 26, informing the memory controller 36 and the scan converter 40 that the current frame is complete. In response to this signal the scan converter 40 increments a frame counter in the PCM 44. The count of the frame counter is converted into a white bar 102 in the window 104 by the graphics processor of the PCM, which is displayed on the display screen. Thus, the white bar 102 moves from left to right in the window 104 in correspondence with the filling of the image frame memory 32 with image frames. When the image frame memory is completely full, the window 104 is completely filled with the white bar.

If the Freeze button is not depressed the memory 32 will wrap around and begin to fill again from the starting address. To indicate this wrap around condition, the white bar remains in the window 104, but now is overwritten by a light gray bar which proceeds from left to right in the window. Thus, if the physician freezes the memory and stops the bar motion in the window, the colors or shades of the bars in the window will tell the user whether she is in a first or subsequent pass through the memory. If the window is both white and black, the physician knows that frame storage was stopped before the memory has been filled for the first time. But if the window is both gray and white, the physician knows that the initially stored frames have been overwritten with new frames as the memory has wrapped around.

As just described, the white bar 102 will fill the window 102 at the same speed as the image frame memory is filled with image frames. The time required to do so is dependent, of course, upon the memory capacity; a larger frame memory will take longer to fill than a smaller memory. The filling of the memory is also a function of the frame rate and characteristics of the frame itself, such as scanline density. If the physician wants the memory 32 to fill at a slower rate, for example, the frame rate can be slowed or a probe or probe aperture with fewer scanlines used. One frame characteristic, pulse rate frequency (PRF), is displayed on the screen at the top of FIG. 3, for instance. By adjusting ultrasound system parameters which influence the PRF, such as Doppler box size or scan depth, the physician can vary the PRF and hence the frame rate and the rate at which the image frame memory is filled. The rate at which the white bar 102 fills the window 104 is affected correspondingly.

As indicated at step 72 in FIG. 2, the physician can use the guide bar 102 to familiarize herself with the scan speed best suited for 3D image acquisition. For example, the physician can press the Loop button on the control panel and allow the image frame memory to fill and wrap around continuously. The physician can then gauge the time required for the alternating white and gray bars to fill the window. Once the physician has gauged the time to fill the memory, she can practice sliding the probe across the patient's body over the ROI in synchronism with the moving bar 102. If the physician is uncomfortable with the short time allowed by a rapidly moving bar, she can adjust one of the parameters which affects frame rate and size, as discussed above. When the physician has mastered the simple task of sweeping the probe across the ROI in the time it takes for the bar 102 to traverse the window 104, she is ready to acquire image slices for three dimensional reconstruction.

Returning to FIG. 2, in step 73 the physician positions the probe at one side of the ROI on the body of the patient. This is the starting location at which the first image plane of the sweep will be acquired, and the starting position from which the physician will slide or sweep the probe across the body of the patient. In step 74 the physician presses the Loop button to clear the image frame memory, frame counter and the guide window. The ultrasound system responds by starting to fill the image frame memory 32 with image frames from the probe, the white bar 102 begins to move across the window 104, and the physician starts to scan by sweeping the probe across the ROI.

When the physician reaches the end of the scan she presses the Freeze button to freeze the current contents of the memory 32, as shown in step 76. If the scan has been properly synchronized, the image plane of the probe will be swept to the other side of the ROI at about the time the white bar has reached the end of its travel across the window. That is, the scan sweep is completed as the memory is almost completely full. This means that a maximal number of frames have been acquired in the sweep across the ROI. If the physician is dissatisfied with the scan, she can repeat the process starting from step 73.

Figure 4:
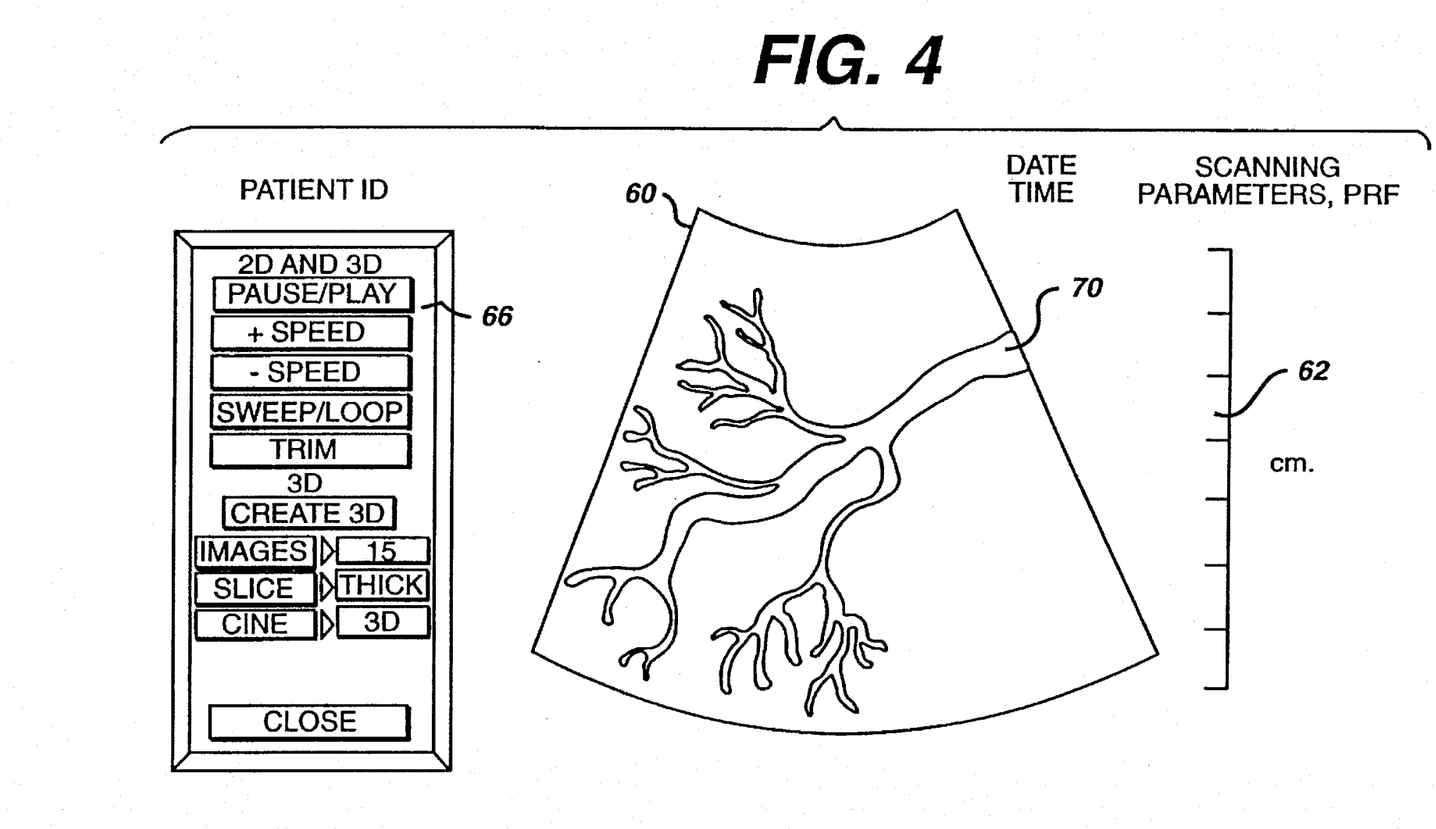
FIG. 4 illustrates an ultrasound image display with a menu for three dimensional image acquisition, processing and display.

After the physician has acquired and stored a sequence of image frames, she can proceed to render a three dimensional ultrasound image. This is done by manipulating a trackball and "Select" button on the control panel 90 to pull down an image frame memory menu 66, as shown in FIG. 4 and in step 78 of FIG. 2. The menu 66 is displayed on the screen by the graphics processor of the PCM 44. The physician sets a number of reconstruction parameters which will govern the 3D processing of the planar image slices, as indicated by step 82 in FIG. 2. In the example of FIG. 4 the ultrasound system is controlled to render a sequence of three dimensional projection images over a sequence of different viewing angles as described in U.S. Pat. 5,485,842. When the projection images are replayed in a real time sequence, a three dimensional rendering of the ROI appears to rotate before the viewer. In a constructed embodiment, the three dimensional presentation is rotated through an angle of ±50°.

One parameter which the physician sets from menu 66 is the number of projection images. In the constructed embodiment the user is allowed to select either 7, 11, or 15 projection images. Other numbers of projection images are possible, to the limit of the space available for projection image storage. If projection images are displayed immediately and not stored, this limitation is avoided. The number of images chosen is evenly distributed over the 100° angle of rotation. Thus, if eleven images are chosen, the projection images have viewing angles which vary by 9° from one projection image to the next. As FIG. 4 shows, the physician uses the trackball to move a cursor (shown as an arrow) in the display to the "Images" menu push-button. The physician presses the Select button on the control panel to cycle the number to the right of the Images push-button to 7, 11, or 15 projection images. In FIG. 4, the number of projection images has been set to 15.

A second parameter which is set in FIG. 4 is the slice thickness. The slice thickness is the distance between the slice planes. If the probe is scanned slowly across the ROI the slice thickness will be thin. If the probe is scanned rapidly the slice thickness will be thick. A third choice in the menu 66 is a medium slice thickness. These subjective choices have been found to enable the rendering of highly representative three dimensional images. If the physician is dissatisfied with the chosen thickness, she can reconstruct the three dimensional presentation again with a different choice of slice thickness.

Other rendering parameters may be included in the menu. For instance, the user may be given a choice of a transparent or surface rendering, as discussed in U.S. patent application Ser. No. 60/013,951, filed Mar. 22, 1996. The user may be able to choose a rendering which views the ROI from the front or the back. This change involves processing the planar image slices in reverse order, and with the x-axis reversed for each slice. A third parameter is a selection of the contrast for the three dimensional presentation.

Figure 5:
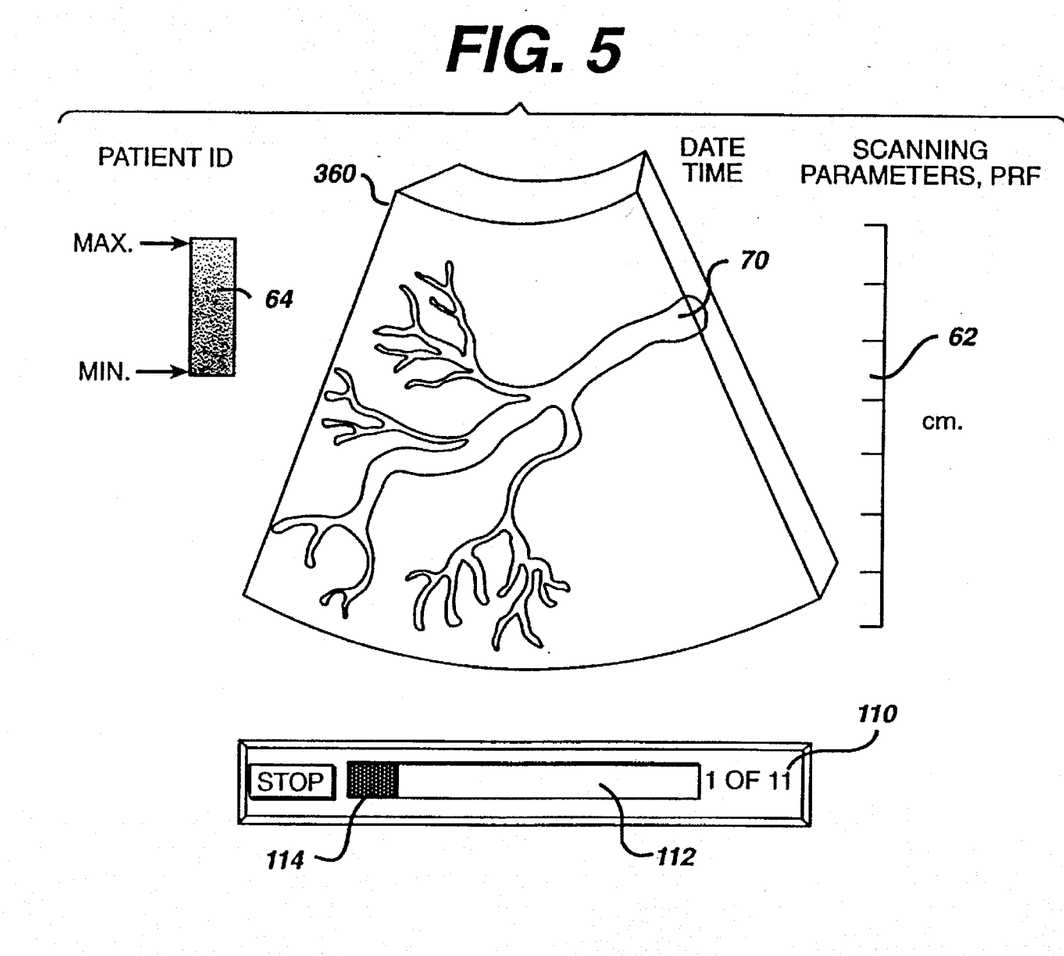
FIG. 5 illustrates an ultrasound image display which informs the user of the progress of three dimensional image reconstruction.

With the reconstruction parameters set as desired, the physician selects the "Create 3D" push-button on the menu and 3D reconstruction begins, as indicated by step 84 in FIG. 2. The menu 66 disappears and the projection images begin to be formed on the display screen as represented in FIG. 5 by image 360. A box 110 appears below the images as the 3D reconstruction begins. The box 110 informs the physician of the progress of the 3D reconstruction and provides a push-button which can be selected by the physician to stop the reconstruction. The number of projection images and the image currently being reconstructed are shown at the right side of the box. As projection images are finished, a gray bar 114 responsive to the frame counter moves across the window 112 in corresponding increments: one-seventh of the window if there are seven projection images, one-eleventh of the window if there are eleven projection images, and so forth. In the example of FIG. 5, the gray bar 114 has moved one eleventh of the distance across the window 112, signifying that the first of eleven projection images has been completed.

As discussed in U.S. Pat. No. 5,485,842 and U.S. Application Ser. No. 60/013,951, 3D reconstruction can be performed in the scan converter 40 using the sequence of image slices stored in the image frame memory 32. As a projection image is completed the frame counter is incremented and the projection image is transferred over the bus 14 to a 3D memory 34 and stored. When 3D reconstruction is complete, a sequence of projection images is stored in the 3D memory 34, each at a different viewing angle from the preceding image in the sequence.

When 3D reconstruction is finished, the sequence of 3D images which has been created and stored in the 3D memory 34 automatically begins to be displayed in sequence, and the three dimensional image of the ROI appears on the screen and begins to turn through its ±50° of rotation, as indicated by step 86 in FIG. 2. The physician can select the "+Speed" and "–Speed" push-buttons to slow down or speed up the rotation of the three dimensional ROI.

Figure 6:
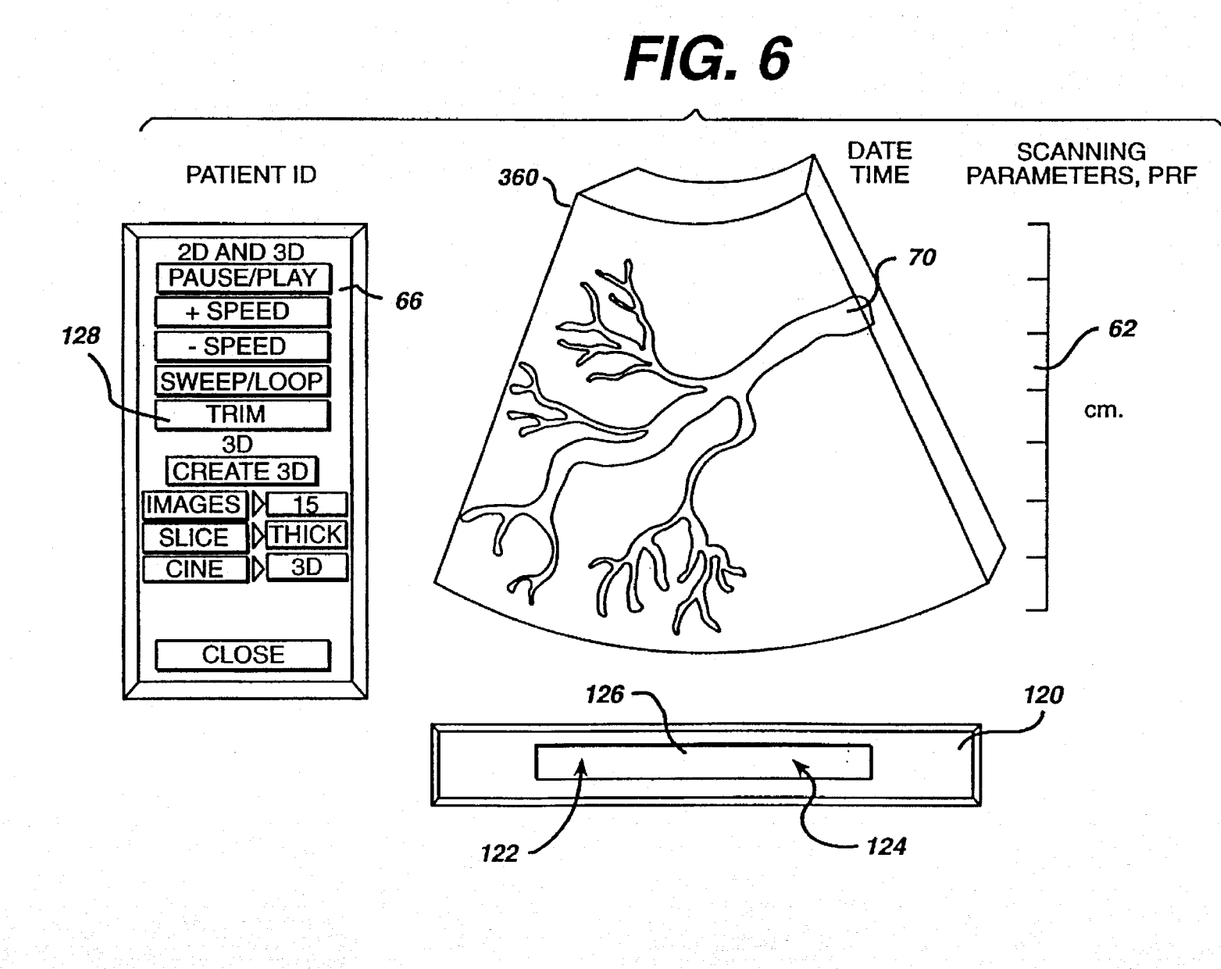
FIG. 6 illustrates an ultrasound image display with a guide to assist in trimming unwanted image planes from the image plane sequence used in three dimensional reconstruction.

It is possible that the physician may discover from viewing the three dimensional ROI that she overscanned the ROI, perhaps acquiring frames of extraneous tissue or flow before or after the desired slices of the ROI. These extraneous slices may obscure portions of the ROI which the physician would like to study. The extraneous slices may be removed from the reconstructed images by pulling down the menu 66 and selecting the "Trim" push-button option 128 as shown in FIG. 6 and step 88 of FIG. 2. When Trim is selected a trim box 120 appears on the screen. The trim box 120 includes a window 126 which, from the acquisition count of the frame counter, represents the sequence of slices acquired and used in the 3D reconstruction. When the trim box first appears, it contains two pointers 122 and 124 at each end of the window 126. These point to the beginning and end of the sequence of slices. Unwanted slices at the beginning and/or end of the sequence can be trimmed (eliminated from the 3D reconstruction) by moving the pointers in from the beginning or end of the slice sequence as shown in FIG. 6. In this example the pointers have been moved by the trackball to trim slices from both the beginning and the end of the sequence. The Select button is depressed to toggle from one pointer to the other, and the selected pointer is moved by manipulating the trackball control. The window 126 can be simply a color or shade which subjectively represents the frame sequence, or can be filled with a sequence of numbers to which the physician can move the pointer to trim at an exact frame in the sequence.

After slices have been trimmed, the 3D reconstruction is repeated by selecting the Create 3D push-button again, which will reconstruct 3D images using the slice frames between the pointers 122 and 124. If the physician is dissatisfied with the new rendering, she can repeat reconstruction after resetting the pointers, or can reconstruct three dimensional images using all of the acquired image frames again as in the initial reconstruction described above.

In addition to the ability to trim frames from the beginning and end of the frame sequence, it is also possible to delete specific frames of the sequence from use in three dimensional reconstruction. This might be desirable, for instance, when reconstructing three dimensional Doppler images from an image frame sequence which includes flash artifacts. "Flash" is the detection of motion from unwanted sources, such as from respiration or other relative motion between the probe and the body, rather than the desired motion of blood flow or moving tissue. While known flash suppression techniques can usually eliminate frames containing unwanted flash, it is possible that a frame of flash artifacts may be acquired, processed and stored in the image frame memory 32. It would be desirable to omit this frame from three dimensional image reconstruction, as it would introduce undesired artifacts in the three dimensional reconstruction.

Figure 7:
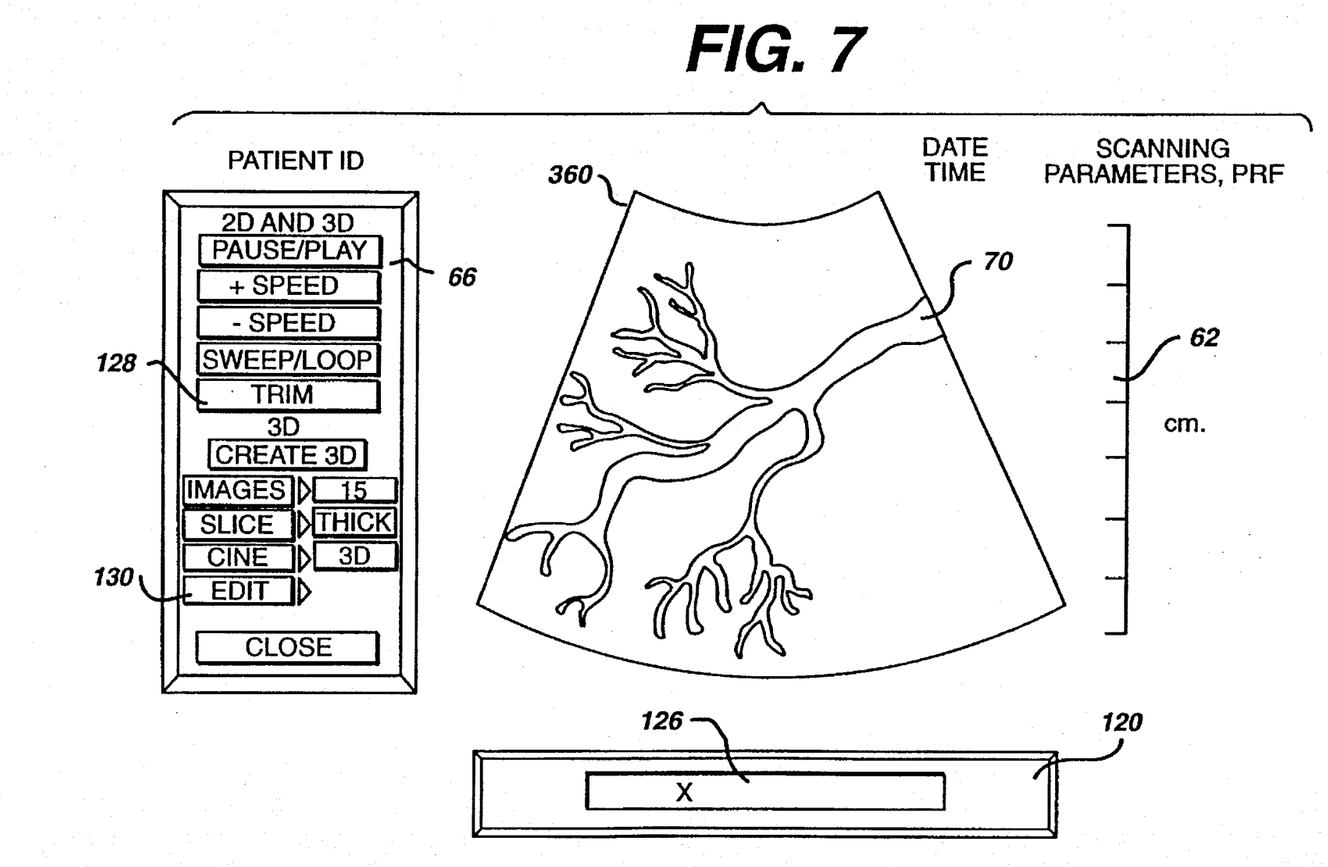
FIG. 7 illustrates an ultrasound image display with a guide to assist in deleting unwanted images from three dimensional reconstruction.

In accordance with a further aspect of the present invention, specific frames may be deleted from three dimensional reconstruction by the use of the "Edit" push-button 130 as shown in FIG. 7. When the Edit push-button is selected, the trim box 120 appears with an "X" in the window 126. In the Edit mode the "X" appears in the window 126 at a location corresponding to the image frame in the image frame memory identified by the current count of the frame counter. As the physician rolls the trackball to the left or the right the frame counter decrements or increments and the image frame 60 corresponding to the count of the counter is displayed on the screen above the trim box 120. Correspondingly, the "X" in the window 126 moves to the left or the right, denoting the location of the currently displayed image in the image frame sequence. When the physician encounters a displayed image with flash or some other characteristic which she does not want used in the three dimensional reconstruction, she depresses the Select button, which freezes the "X" in the window 126 and marks the selected frame as one which is to be omitted from three dimensional reconstruction. Depressing the Select button a second time cancels the selection and allows the "X" to move to select another frame. Selecting the Edit push-button a second time displays a second "X", which can be moved with the trackball as the image frames are sequentially displayed and scanned for possible selection of another frame for deletion from three dimensional reconstruction.

After the physician has selected all of the image frames she wishes to delete from three dimensional reconstruction, she selects the Close push-button to terminate the Edit mode. If an "X" remains in the window 126 which has not be selected, it is deleted from the window. The physician can then select the Create 3D push-button to reconstruct three dimensional images with the omission of the "Edited"

frames. If the physician is dissatisfied with the result of three dimensional reconstruction, she can re-enter the Edit mode to delete additional frames, or select displayed "X's" a second time to include previously deleted image frames in the next three dimensional reconstruction.

While the preceding example show use of a visual scanning guide, it will be appreciated that other types of guides can also be used. For instance, FIG. 1 shows an audio modulator 52 coupled to receive the count of the frame counter of the PCM 44. The audio modulator drives a speaker 54 to produce an audible tone. The frequency of the tone may be modulated from a low pitch to a high pitch in correspondence with the filling of the image frame memory 32. Alternatively or in addition, the duration of the tone can correspond to the time during which the frame memory is being filled. Thus the user can alternatively or concurrently listen to an audible scanning guide. The audible guide enables the physician to focus her attention on the probe and its movement across the body of the patient, without the need to divert her gaze to the system display.

It will also be appreciated that, while the preceding examples describe the movement of the probe to acquire a substantially parallel set of image planes through the ROI, other forms of probe movement may also be used. For instance, the probe may be rotated about the central axis of the probe, thereby acquiring a sequence of angularly disposed image planes which intersect at a common axis, which may be used to form a 3D rendered image. Another alternative is to rock the probe against the body of the patient, thereby sweeping the ROI with a fan of image planes which can be reconstructed into a three dimensional wedge-shaped ROI. These probe motions can be performed freehand, or with the assistance of various mechanical probe or transducer arms, rockers, or rotators. In each case the guide of the present invention can be utilized to assist the physician in monitoring or controlling the duration and speed of acquisition of the image plane sequence.

What is claimed is:

1. A medical ultrasonic diagnostic imaging system which acquires ultrasonic echo information over a volumetric region of the body for presentation in a three dimensional display format, comprising:
    an ultrasonic probe for scanning a patient to acquire ultrasonic echo information from a volumetric region of the body;
    a storage device for storing signals derived from said ultrasonic echo information;
    a processor for processing said ultrasonic echo information to form a three dimensional ultrasonic representation of said volumetric region; and
    a scanning guide which is observable by a user to aid the user in scanning a patient with the probe during the acquisition of echo information from a volumetric region of the body.

2. The medical ultrasonic diagnostic imaging system of claim 1, wherein said scanning guide comprises means for aiding the user in determining the time during which said volumetric region is to be scanned.

3. The medical ultrasonic diagnostic imaging system of claim 1, wherein said scanning guide comprises means for aiding the user in determining the rate at which said probe is to be scanned over said volumetric region.

4. The medical ultrasonic diagnostic imaging system of claim 1, wherein said scanning guide comprises means for informing the user as to the amount of ultrasonic echo information which has been acquired during the scanning of said volumetric region.

5. The medical ultrasonic diagnostic imaging system of claim 1, wherein said scanning guide comprises means for informing the user when a desired amount of ultrasonic echo information has been acquired during the scanning of said volumetric region.

6. The medical ultrasonic diagnostic imaging system of claim 1, further comprising a circuit for coupling said storage device to said scanning guide, whereby said scanning guide operates in correspondence to the filling of said storage device with signals derived from said ultrasonic echo information.

7. The medical ultrasonic diagnostic imaging system of claim 1, wherein said storage device further comprises a storage device which can be utilized during two dimensional imaging as a cine memory.

8. A medical ultrasonic diagnostic imaging system which acquires ultrasonic echo information over a volumetric region of the body for presentation in a three dimensional display format, comprising:
    an ultrasonic probe for scanning a patient to acquire ultrasonic echo information from a volumetric region of the body;
    a storage device for storing signals derived from said ultrasonic echo information;
    a processor for processing said ultrasonic echo information to form a three dimensional ultrasonic representation of said volumetric region;
    a scanning guide which is observable by a user to aid the user in scanning a patient with the probe during the acquisition of echo information from a volumetric region of the body; and
    a circuit for coupling said storage device to said scanning guide, whereby said scanning guide operates in correspondence to the filling of said storage device with signals derived from said ultrasonic echo information;
    wherein said circuit includes a counter for counting units of storage which are filled with signals derived from said ultrasonic echo information.

9. The medical ultrasonic diagnostic imaging system of claim 8, wherein said ultrasonic probe comprises means for acquiring ultrasonic echo information from a volumetric region of the body to form image frames, and wherein said units of storage are image frames.

10. The medical ultrasonic diagnostic imaging system of any one of claims 1–8, further comprising a display device, and wherein said scanning guide comprises a visual indicator.

11. The medical ultrasonic diagnostic imaging system of claim 10, wherein said visual indicator comprises a moving visual indicator.

12. The medical ultrasonic diagnostic imaging system of claim 11, wherein said moving visual indicator comprises a bar.

13. The medical ultrasonic diagnostic imaging system of any one of claims 1–8, further comprising an audio speaker, and wherein said scanning guide comprises an audible sound.

14. The medical ultrasonic diagnostic imaging system of claim 13, further including a modulator coupled to said audio speaker for producing a tone modulated in volume, frequency, or duration in correspondence with the desired scanning of said volumetric region.

15. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing ultrasonic image frames derived from said ultrasonic echo information;

a display, coupled to said storage device for visually indicating the amount of image frames stored by said storage device; and a user adjustable indicator which is presented on said display for indicating the portion of said stored image frames which are represented in a three dimensional display.

16. The medical ultrasonic diagnostic imaging system of claim 15, further including a three dimensional ultrasonic image processor, responsive to said user adjustable indicator, for forming a three dimensional image from said portion of said stored image frames indicated by said indicator.

17. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing ultrasonic image frames derived from said ultrasonic echo information;

a display, coupled to said storage device for visually indicating the amount of image frames stored by said storage device;

a user adjustable indicator which is presented on said display for indicating the portion of said stored image frames which are represented in a three dimensional display; and a three dimensional ultrasonic image processor, responsive to said user adjustable indicator, for forming a three dimensional image from said portion of said stored image frames indicated by said indicator;

wherein said storage device comprises means for storing image frames and retaining the relative spatial position of said image frames in relation to said volumetric region, wherein said display visually indicates said relative spatial position of said image frames, and wherein said user adjustable indicator is adjustable by a user to eliminate frames spatially relating to an end of said volumetric region from three dimensional image processing.

18. The medical ultrasonic diagnostic imaging system of claim 17, wherein said user adjustable indicator is readjustable by a user to include frames in three dimensional image processing which were previously eliminated from three dimensional image processing by adjustment of said indicator.

19. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing ultrasonic image frames derived from said ultrasonic echo information;

a processor for processing said ultrasonic image frames to form a three dimensional ultrasonic representation of said volumetric region; and a user variable indicator for indicating an image frame of said stored image frames which is to be omitted from three dimensional processing.

20. The medical ultrasonic diagnostic imaging system of claim 19, wherein said indicator includes means for indicating the complete set of image frames stored in said storage device, and a visual marker for indicating the position of an image frame in said set of image frames which is to be omitted from three dimensional processing.

21. The medical ultrasonic diagnostic imaging system of claim 19, wherein said indicator comprises an image display for displaying an image frame of said stored image frames which may be selected for omission from three dimensional processing.

22. The medical ultrasonic diagnostic imaging system of claim 19, wherein said indicator further comprises means for indicating a plurality of image frames of said stored image frames which are to be omitted from three dimensional processing.

23. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing ultrasonic image frames derived from said ultrasonic echo information;

a processor for processing said ultrasonic image frames to form a three dimensional ultrasonic representation of said volumetric region; and a user variable indicator for indicating an image frame of said stored image frames which is to be omitted from three dimensional processing, wherein said indicator includes means for indicating the complete set of image frames stored in said storage device, and a visual marker for indicating the position of an image frame in said set of image frames which is to be omitted from three dimensional processing; and wherein the position of said visual marker is adjustable by the user in relation to said complete set indicating means.

24. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing ultrasonic image frames derived from said ultrasonic echo information;

a processor for processing said ultrasonic image frames to form a three dimensional ultrasonic representation of said volumetric region; and a user variable indicator for indicating an image frame of said stored image frames which is to be omitted from three dimensional processing, wherein said indicator includes means for indicating the complete set of image frames stored in said storage device, and a visual marker for indicating the position of an image frame in said set of image frames which is to be omitted from three dimensional processing; and further comprising a counter, coupled to said storage device for indicating the position of an image frame among said stored ultrasonic image frames, wherein said indicator is responsive to the count of said counter.

25. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing ultrasonic image frames derived from said ultrasonic echo information;

a processor for processing said ultrasonic image frames to form a three dimensional ultrasonic representation of said volumetric region;

a user variable indicator for selecting an image frame of said stored image frames which is to be omitted from three dimensional processing; and a user variable canceller circuit for canceling the selection of an image for omission from three dimensional processing, whereby a previously selected image frame may be again included in three dimensional processing.

26. The medical ultrasonic diagnostic imaging system of claim 25, wherein said user variable indicator comprises an image display for displaying an ultrasonic image of said stored ultrasonic image frames which may be selected for omission from three dimensional processing.

27. A medical ultrasonic diagnostic imaging system which acquires ultrasonic echo information over a volumetric region of the body for presentation in a three dimensional display format, comprising:

an ultrasonic probe for acquiring ultrasonic echo information from a volumetric region of the body;

a storage device for storing a sequence of ultrasonic image frames derived from said ultrasonic echo information;

a processor for processing said ultrasonic image frames to form a three dimensional ultrasonic representation of said volumetric region;

user variable means for selecting an image frame of said stored image frame sequence which is to be omitted from three dimensional processing; and a display for displaying image frames of said stored image frame sequence which may be selected by said user variable means.

* * * * *